(12) United States Patent
Shackleton

(10) Patent No.: US 6,292,821 B1
(45) Date of Patent: Sep. 18, 2001

(54) INFORMATION PROCESSING

(75) Inventor: Mark A Shackleton, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,897
(22) PCT Filed: Jan. 16, 1998
(86) PCT No.: PCT/GB98/00150
  § 371 Date: Mar. 11, 1998
  § 102(e) Date: Mar. 11, 1998
(87) PCT Pub. No.: WO98/36354
  PCT Pub. Date: Aug. 20, 1998

(30) Foreign Application Priority Data

Feb. 14, 1997 (GB) .................................................. 97300989

(51) Int. Cl.[7] ..................................................... G06F 9/00
(52) U.S. Cl. .......................... 709/104; 709/100; 709/108; 710/5
(58) Field of Search ................................... 707/1, 2, 102; 709/310, 313, 314, 319, 100, 104, 108, 232; 710/244, 5, 56; 711/136, 151, 165, 170, 171; 370/465

(56) References Cited

U.S. PATENT DOCUMENTS

| | | | |
|---|---|---|---|
| 3,623,002 | * 11/1971 | Mayne | 710/244 |
| 4,201,889 | * 5/1980 | Lawrence et al. | 320/68 |
| 4,509,119 | * 4/1985 | Gumaer et al. | 711/136 |
| 5,253,342 | * 10/1993 | Blount et al. | 709/232 |
| 5,513,181 | * 4/1996 | Bresalier et al. | 370/465 |
| 5,784,698 | * 7/1998 | Brady et al. | 711/171 |
| 5,812,846 | * 9/1998 | Dowedeit | 709/108 |
| 5,893,086 | * 4/1999 | Schmuck et al. | 707/1 |
| 5,983,195 | * 11/1999 | Fierro | 705/10 |

* cited by examiner

Primary Examiner—Majid A. Banankhah
(74) Attorney, Agent, or Firm—Nixon & Vanderhye P.C.

(57) ABSTRACT

An information processing system includes: a first data pool containing information in the form of data items; a plurality of processing elements disposed within the first data pool for processing data items; and a system controller arranged to control the processing elements to take selectively at least one data item from a plurality of data items in the first data pool of the processing elements is arranged to perform, autonomously and asynchronously, a respective operation on its selected at least one data item and produce a resultant data item, and to place the resultant data item into the first data pool. In a preferred embodiment, a second data pool is separated from the first data pool by a boundary and a transfer mechanism governs transfer of data items between the data pools. Input information is put into the second data pool by a user, and after the system has completed processing, output data is available in the second data pool, having been transferred from the first data pool under control of the transfer mechanism.

21 Claims, 7 Drawing Sheets

INFORMATION PROCESSING

BACKGROUND OF THE INVENTION

1. Field of the Invention

The present invention relates to methods and systems for processing information.

2. Related Art

The majority of present day computers process information using the von Neumann information processing model where a set of instructions is stepped through sequentially, each instruction being initiated by a pulse from a regular train of clock pulses. Such computer systems have proved very useful in situations where information is predictable and the same well defined set of operations needs to be carried out repetitively to process the information. Another known method for processing information is parallel processing where there are multiple processors which concurrently process information. In one such architecture multiple identical processors are used to carry out the same operation on many items of data concurrently, rather than passing the data sequentially through a single processor, thereby processing the information at a greater rate.

In both sequential and parallel architectures the processing elements are typically connected in a fixed or relatively inflexible configuration with the various component parts being controlled by regular clock pulses to ensure that the information remains synchronised as it is passed from one component to another within the system.

Information processing systems and methods based on the traditional von Neumann model or using existing parallel processing architectures have proved useful in domains where the information processing task can be easily reduced to a series of highly repetitive, well ordered and relatively simple steps. They have proved far less successful in problem domains which involve significant amounts of pattern matching and classification where data may be noisy and unpredictable. In such domains algorithms are often brittle, causing failures when unanticipated data is provided as input. As systems become larger and more complex the likelihood that an unanticipated state may occur increases, similarly increasing the probability of the system failing or giving incorrect results.

SUMMARY OF THE INVENTION

In accordance with a first aspect of the present invention there is provided an information processing system comprising:

a first data pool for containing information in the form of data items;

a plurality of processing elements disposed within said first data pool for processing data items; and a system controller arranged to control the processing elements to take selectively at least one data item from a plurality of data items in said first data pool; in which system, each of the processing elements is arranged to perform, autonomously and asynchronously, a respective operation on its selected at least one data item and produce a resultant data item, and to place the resultant data item into said first data pool.

Preferably, said system controller is arranged such that said selective taking of at least one data item from a plurality of data items in said first data pool is on a random basis.

Preferably, systems of the present invention comprise a second data pool for containing input information and output information in the form of data items, said second data pool being adjacent to said first data pool and separated from it by a boundary; and further comprise a transfer means for importing data items of input information from said second data pool to said first data pool and for exporting data items of output information from said first data pool to said second data pool.

The transfer means may be constituted by one or more of the processing elements.

Preferably, at least one of said processing elements constituting the transfer means is arranged to import data items of input information from said second data pool to said first data pool, such a processing element being referred to as an importing processing element; and at least one of said processing elements constituting the transfer means is arranged to export data items of output information from said first data pool to said second data pool, such a processing element being referred to as an exporting processing element.

The importing processing element may be a different processing element from the exporting processing element. Alternatively, a single processing element may constitute both said importing processing element and said exporting processing element.

Preferably, said importing processing element is arranged to select a data item of input information from said second data pool in accordance with a first predetermined criterion, to create a copy of said selected data item of input information and place said copy into said first data pool, and to destroy said selected data item of input information.

The exporting processing element may be arranged to select a data item of output information from said first data pool in accordance with a second predetermined criterion, to create a copy of said selected data item of output information and place said copy into said second data pool, and to destroy said selected data item of output information.

Preferably, each of the processing elements is arranged to distinguish between data items that it is allowed to operate upon and data items that it is not allowed to operate upon.

Preferably, at least one of said processing elements is arranged to perform a join operation on two or more selected data items.

Preferably, at least one of said processing elements is arranged to perform a break operation on a selected data item.

Preferably, said system controller is arranged such as to determine the rate at which at least one of the processing elements performs its selection from said first data pool.

In accordance with a second aspect of the present invention, there is provided a method of processing information comprising the steps of:

(i) populating a first data pool with a plurality of data items and a plurality of processing elements, and, for each of the processing elements, (ii) selecting, in accordance with a predetermined function, at least one of the data items currently in the first data pool and taking the selected data item(s) from the first data pool, (iii) performing, autonomously and asynchronously, by the associated processing element, a respective operation on its selected data item(s) and producing a resultant data item, and (iv) placing the resultant data item in said first data pool.

Preferably, said predetermined function of the selecting and taking step randomises the selection of said at least one data item.

Preferably, the selecting and taking step includes a sub-step of distinguishing between data items that the processing element is allowed to operate upon and data items that it is not allowed to operate upon.

Preferably, said step of populating said first data pool with a plurality of data items comprises transferring data items which meet a first predetermined criterion relating to input information from a second data pool to said first data pool.

There may be included a step of transferring data items which meet a second predetermined criterion relating to output information from said first data pool to said second data pool.

Preferably, the performing step comprises a join operation on two or more selected data items.

The performing step may comprise a break operation on a selected data item.

Preferably, said predetermined function defines the rate of selection of said at least one data item.

Systems of the present invention are highly parallel, with constituent processing elements operating asynchronously on the data. The behavior of the information processing system can be controlled not only by the specific operations performed by the processing elements, but also by the dynamics which affect the rate at which particular processing elements operate.

A unit of information is typically represented by multiple data items, or a "concentration" of data items, and this concentration can also be modified so as to affect the results of the processing carried out by the system. The transfer of data between processing elements is a result of each processing element's method of selecting appropriate data from the data pool rather than being determined by fixed data paths between the elements. System attributes including the dynamics, data item concentrations, and the processing elements data selectivity can be varied smoothly to control the system behavior and avoid the brittleness associated with 30 the design of traditional architectures.

Embodiments of an information processing system in accordance with the present invention will now be described with reference to the drawings in which:

DETAILED DESCRIPTION OF EXEMPLARY EMBODIMENTS

Figure 1:
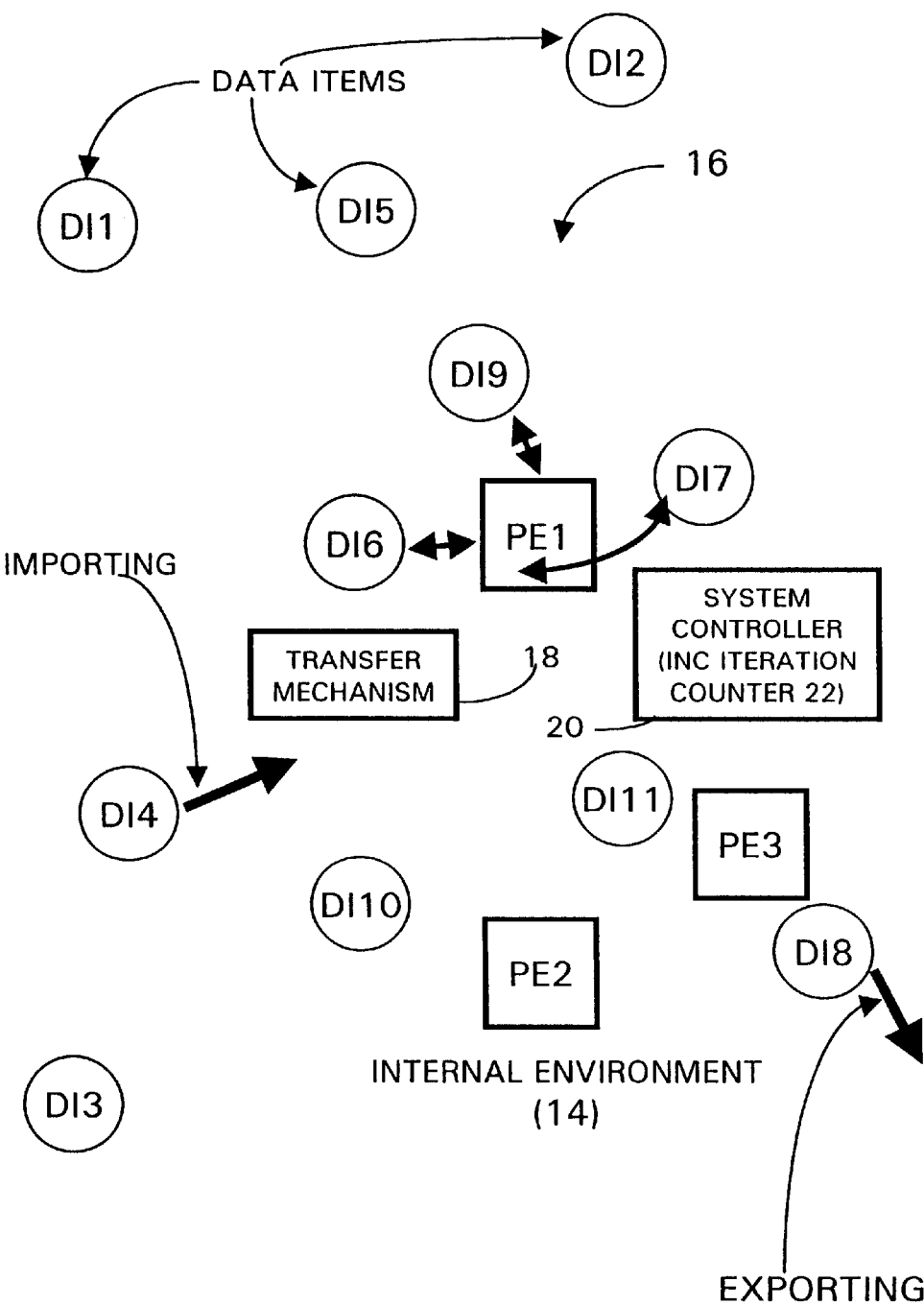
FIG. 1 is a schematic overview of an information processing system of the present invention.
Figure 2:
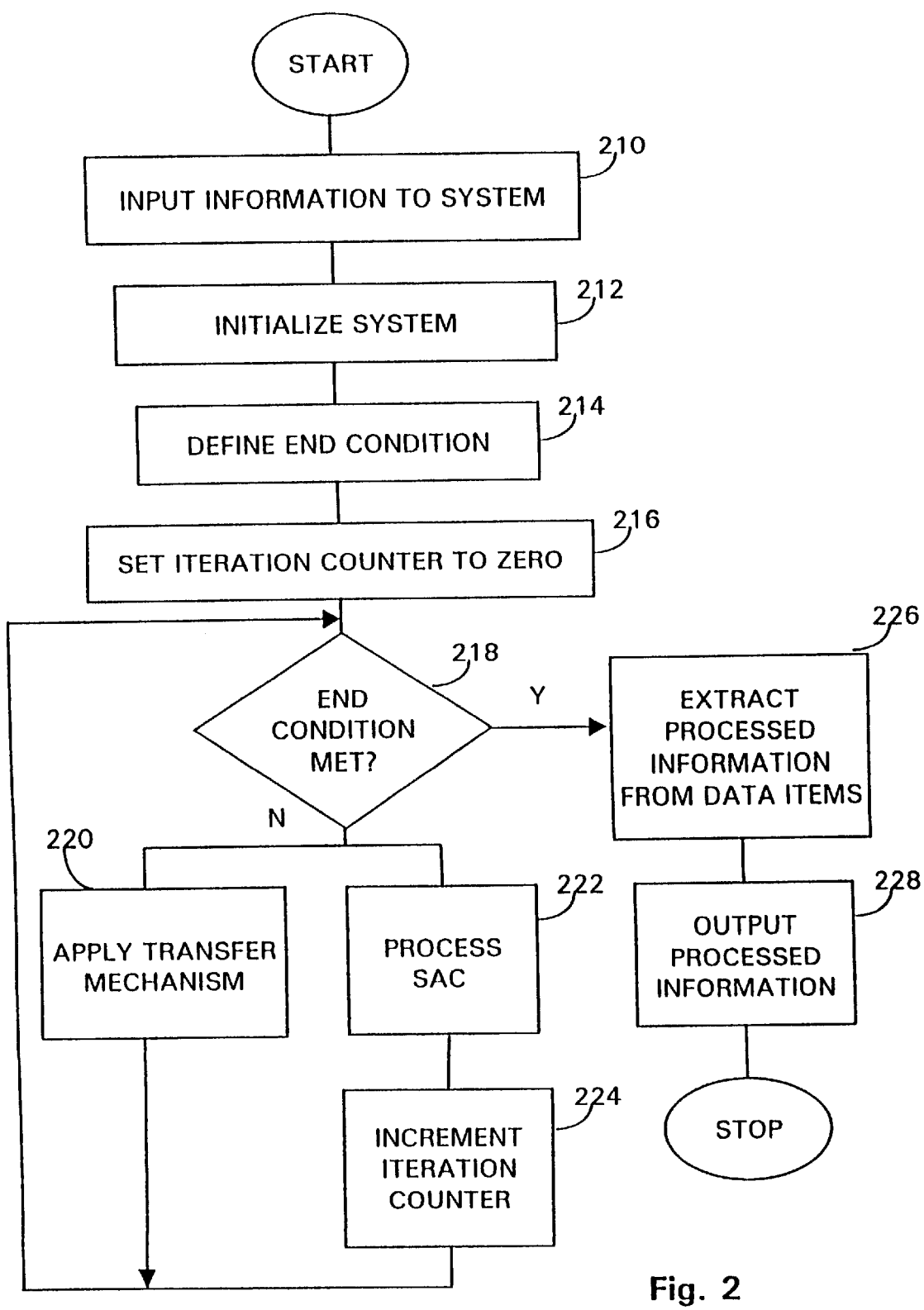
FIG. 2 is a top level flowchart of the information processing system of FIG. 1.
Figure 3:
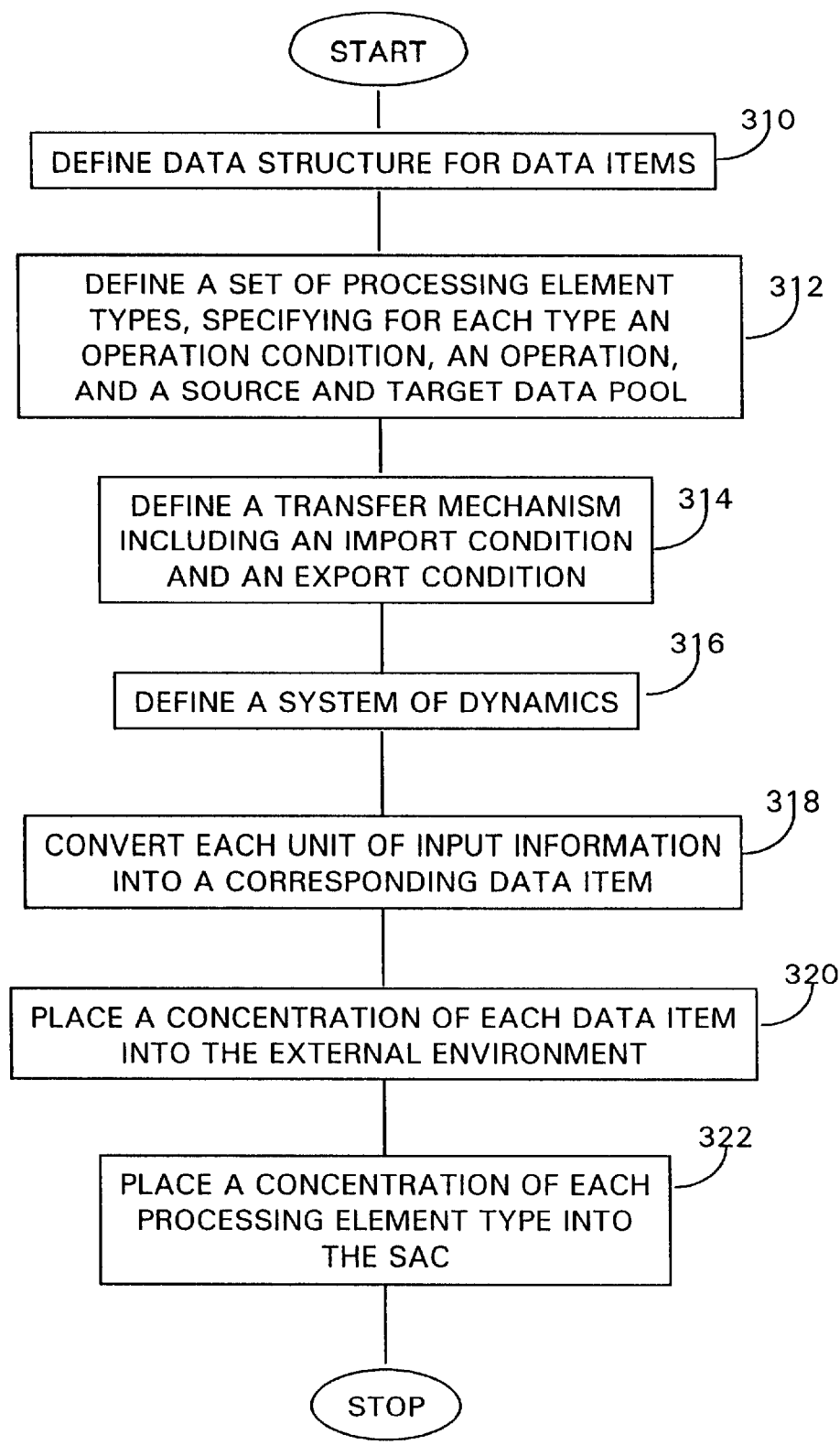
FIG. 3 is a flowchart showing the initialisation procedure of the information processing system of FIG. 1.
Figure 4:
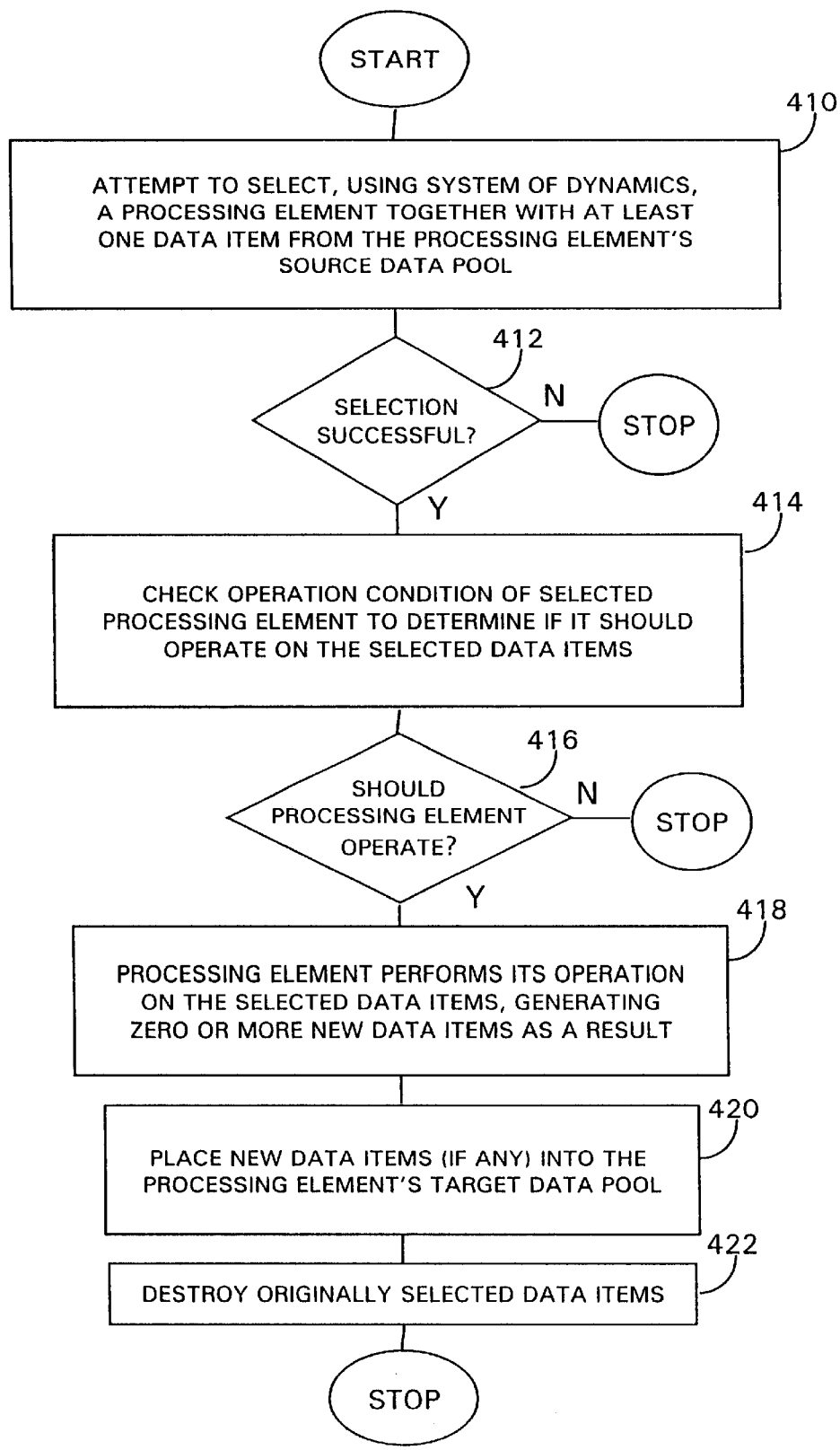
FIG. 4 is a flowchart showing the processing iteration for an enclosure of the information processing system of FIG. 1.
Figure 5:
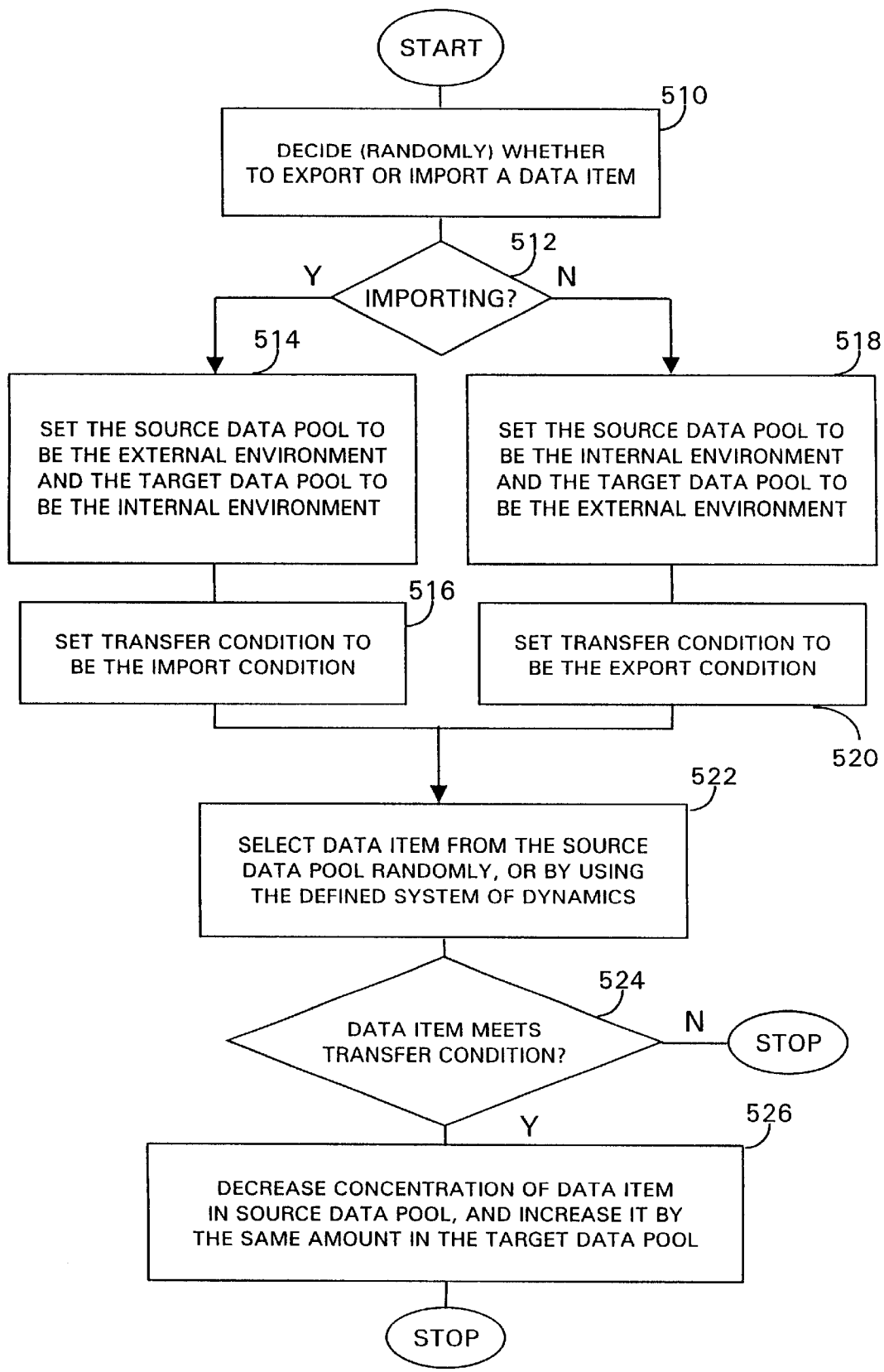
FIG. 5 is a flowchart showing a transfer mechanism of the information processing system of FIG. 1.

In FIG. 1, and with reference to the flowcharts of FIGS. 2 to 7, there is shown an information processing system comprising an external environment or data pool 12 surrounding an internal environment or data pool 14, and separated from it by a boundary 16. The internal environment 14 and the boundary 16 together are referred to as an "enclosure" or a "sac" and these terms are used interchangeably hereinafter. The external environment 12, contains a set of data items DIs, of which only data items DI1 to DI5 are shown. The data items are placed in the external environment 12 by a user in an initialization process described later.

Associated with the enclosure 14, 16 is a transfer mechanism 18 which selectively transfers data items between the external environment 12 and the internal environment 14. Transfer mechanism 18 is shown schematically as a discrete entity not connected to data item DI4 which is shown in FIG. 1 being imported and data item DI8 which is which is shown in FIG. 1 being exported, but in practice the transfer mechanism 18 will be intimately involved in the importing and exporting of the data items.

The internal environment 14 contains a set of data items, of which only data items DI6 to DI11 are shown, and a set of processing elements PEs, of which only processing elements PE1, PE2 and PE3 are shown. In the preferred embodiment, the data items within the internal environment 14 are the result of the operation of the transfer mechanism 18 and the processing elements.

Each processing element is associated with a source data pool, from which it draws one or more data items to operate on, and a target data pool into which it places the result of the operation. In this embodiment, the source data pool for the processing elements is the internal data pool 14, which is also the target data pool.

The operation of the processing elements is controlled by a system controller 20 which includes an iteration counter 22.

In order to process input information, the user of the system will first obtain the input information to be processed (step 210), initialize the system (step 212), define the end condition for the processing (step 214), set the iteration counter 22 to zero (step 216) and then initiate processing by the system. The system will then perform processing of the information by repeatedly carrying out the following actions, asynchronously and in parallel, with invocation of the actions being governed by the system controller 20 until the end condition is met (step 218). Transfer data items between the external environment 12 and the internal environment 14 (in either direction) under the control of the transfer mechanism 18 (step 220). Process the sac (step 222, shown in detail in FIG. 4) and increment the iteration counter 22 (step 224).

When the end condition is met the processed information is extracted from data items in the external data pool (step 226) and the processed information is output (step 228). The system ceases processing iterations when the system controller 20 determines that the task specific end condition (set by the user in step 214) has been reached, in this specific embodiment, that a fixed number of processing iterations has been performed.

In variants, different task specific end conditions are used to determine when the system ceases processing.

The system can be configured to carry out many alternative tasks according to the specific instructions that the system controller 20 is set up to operate under, or given by the user, in the initialisation step 212, also called initialization procedure.

In the initialization procedure (step 212, shown in detail in FIG. 3), the user defines a data structure for the data items (step 310), defines a set of processing element types (step 312), defines the operation of the transfer mechanism 18 (step 314, shown in detail in FIG. 5), defines a system of dynamics, i.e. the operation of the system controller 20, (step 316), converts each unit of input information into a corresponding data item (step 318), places a concentration of each data item into the external environment (step 320), and places a concentration of each processing element type into the sac (step 322). Each processing element type is defined (step 312) by specifying an operation condition, an operation, and associated source and target data pools. The transfer mechanism 18 is defined (step 314) by specifying an import condition and an export condition.

In the processing iteration of the system (shown in detail in FIG. 4), the system controller 20, in step 410, attempts to select, using the system of dynamics defined in step 316, a processing element together with at least one data item from the processing element's source data pool, i.e. the sac.

If the selection is successful (step 412), the system controller 20 then checks the operation condition of the selected processing element to determine if it should operate on the selected data item(s) (step 414).

If the processing element should operate (step 416), then the processing element performs its operation on the selected data item(s), generating zero or more new data items as a result (step 418), and placing any such new data items into the processing element's target data pool, i.e. the sac (step 420), and destroying the originally selected data item(s) (step 422).

In the operation of the transfer mechanism 18 of the system, the transfer mechanism 18 decides randomly whether to export or to import a data item (step 510).

If the decision is importing (step 512), the transfer mechanism 18 sets the source data pool to be the external environment and the target data pool to be the internal environment (step 514), and sets the transfer condition to be the import condition (step 516).

If the decision is exporting (step 512), the transfer mechanism 18 sets the source data pool to be the internal environment and the target data pool to be the external environment (step 518), and sets the transfer condition to be the export condition (step 520).

Then the transfer mechanism 18 selects a data item from the source data pool randomly (step 522). In a variant, this selection is under the predetermined control of the defined system of dynamics.

If the selected data item meets the transfer condition (step 524), the transfer mechanism 18 decreases the concentration of data item in the source data pool, and increases it by the same amount in the target data pool (step 526).

Consider an example where the system is to be used to sort a set of unique integer values into a monotonically increasing list of values. In this case, the initial data items comprise multiple (a concentration of) unit length lists of each integer value to be sorted, and the system output is one or more copies (a concentration) of the sorted list of integers. In this case the transfer mechanism 18 is adapted to allow unit length lists to pass from the external environment 12 to the internal environment 14, and to allow lists of the desired (sorted) length to pass from the internal environment 14 to the external environment 12. Multiple copies (or concentrations) of two types of processing elements are sufficient to carry out the main processing tasks involved in assembling the sorted lists as described in more detail later.

The components of the information processing system will now be described in more detail.

A data item comprises the combination of a task specific data structure defined during system initialization (step 310) and an associated "concentration". The concentration can be either a non-negative integer value indicating how many distinct instances of a data item are present, or a non-negative real value representing the quantity of the data item that exists in a data pool. In the example being considered here, concentration of a particular data item is represented by the number of instances of that data item present in a data pool.

As mentioned, a processing element operates upon one or more data items which originate from its associated source data pool (the internal data pool in this specific embodiment) to produce zero or more new data items which are inserted into the associated target data pool (the internal data pool), (steps 418 and 420). Each processing element has an associated "concentration" (step 322) indicating how many instances of the processing element are present or the quantity of the processing element that exists. Additionally, each processing element has an "operation condition" (defined in step 312) which determines whether or not it will operate on a given set of one or more data items, and an operation (also defined in step 312) which it performs on data items which satisfy the operation condition. The operation results in the destruction of the data items drawn from the source data pool (step 422) and the insertion of any new data items into the target data pool (step 420).

As described, the transfer mechanism 18 provides a means for selectively transferring data items across the boundary 16, and acts as a selective filter in each direction (import or export of data items). It is specified by two conditions, an import condition and an export condition (defined in step 314), which a data item must satisfy in order for the transfer of the data item to be allowed between external and internal data pools in the appropriate direction. Transfer consists of an exchange of concentration of the data item across the boundary. When the concentration is represented by multiple discrete data item instances, these are effectively transferred by a copy and delete mechanism.

The system controller 20 determines the order and rate of processing, i.e. the dynamics of the processing system, carried out by the processing elements. It determines which processing element is to be activated, i.e. commanded to perform its operation, and the selection of one or more data items from the internal data pool.

In the example of the specific embodiment, the system is configured to sort a set of unique integers into a sorted, monotonically increasing list. In this case a data item's data structure is defined to be a list of integer values (data elements) and two types of processing element are defined which are called "join" and "break". For each processing element type, the processing element's source and target data pools are set to be the sac's internal data pool. The transfer mechanism's import condition is that a data item should have unit length, i.e. one data element, and its export condition is that a data item has a length, i.e. the number of its data elements, equal to the number of input integer values, that is, it is a fully sorted list. Concentrations of data items and processing elements are specified, in this example, by non-negative integer values which define the number of discrete instances of data items and processing elements that are present.

The system of dynamics programmed into the system controller 20 provides the mechanism by which the next processing element to operate is chosen together with the data item(s) it may operate upon. The system of dynamics in this specific example is determined by: a toroidal surface upon which data items and processing elements are placed with initial positions randomly distributed across the surface. random velocities associated with each data item instance initially, and as they are produced by processing elements.

Figure 6:
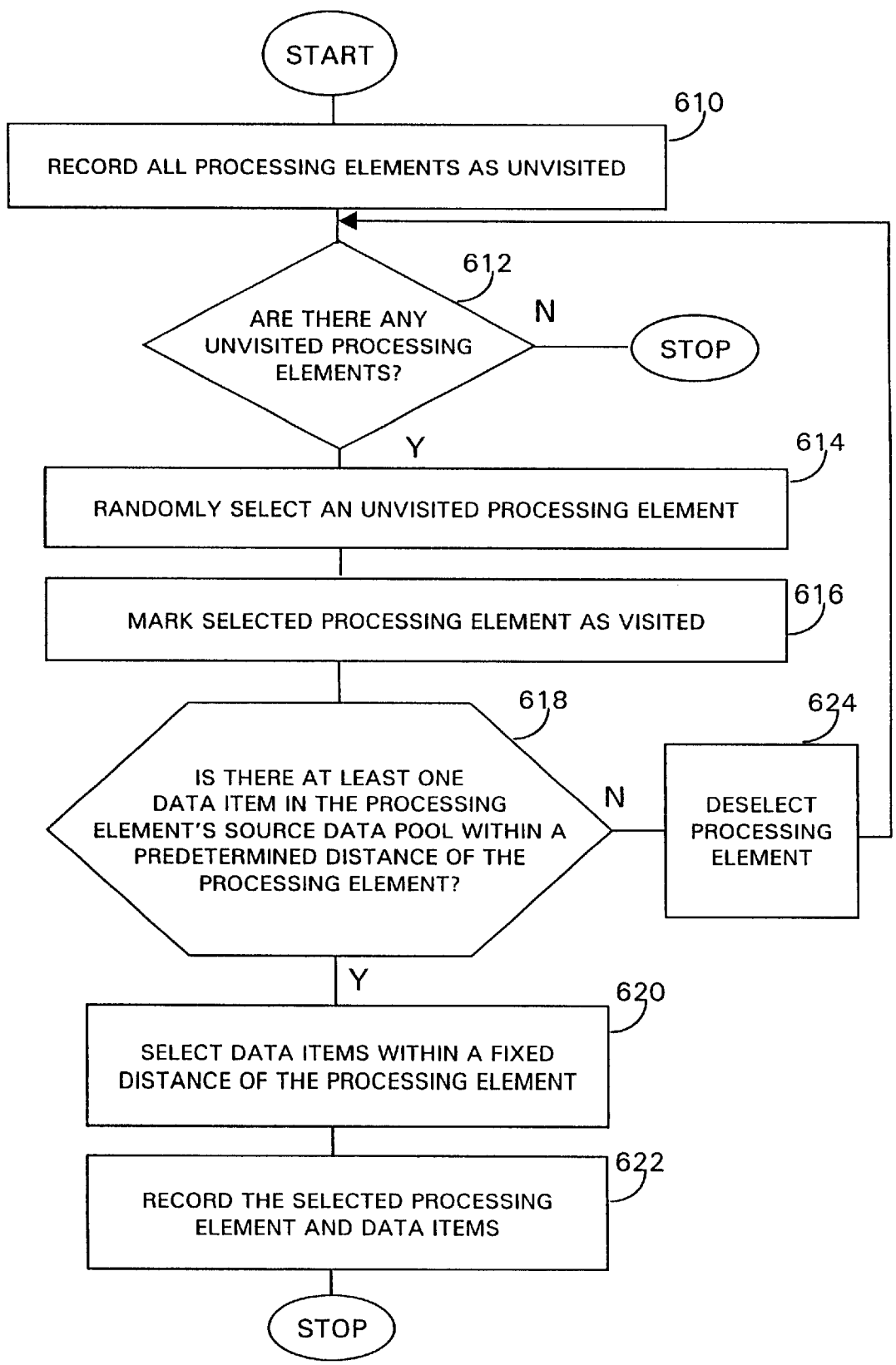
FIG. 6 is a flowchart showing a first example of the system dynamics of the information processing system of FIG. 1.
Figure 7:
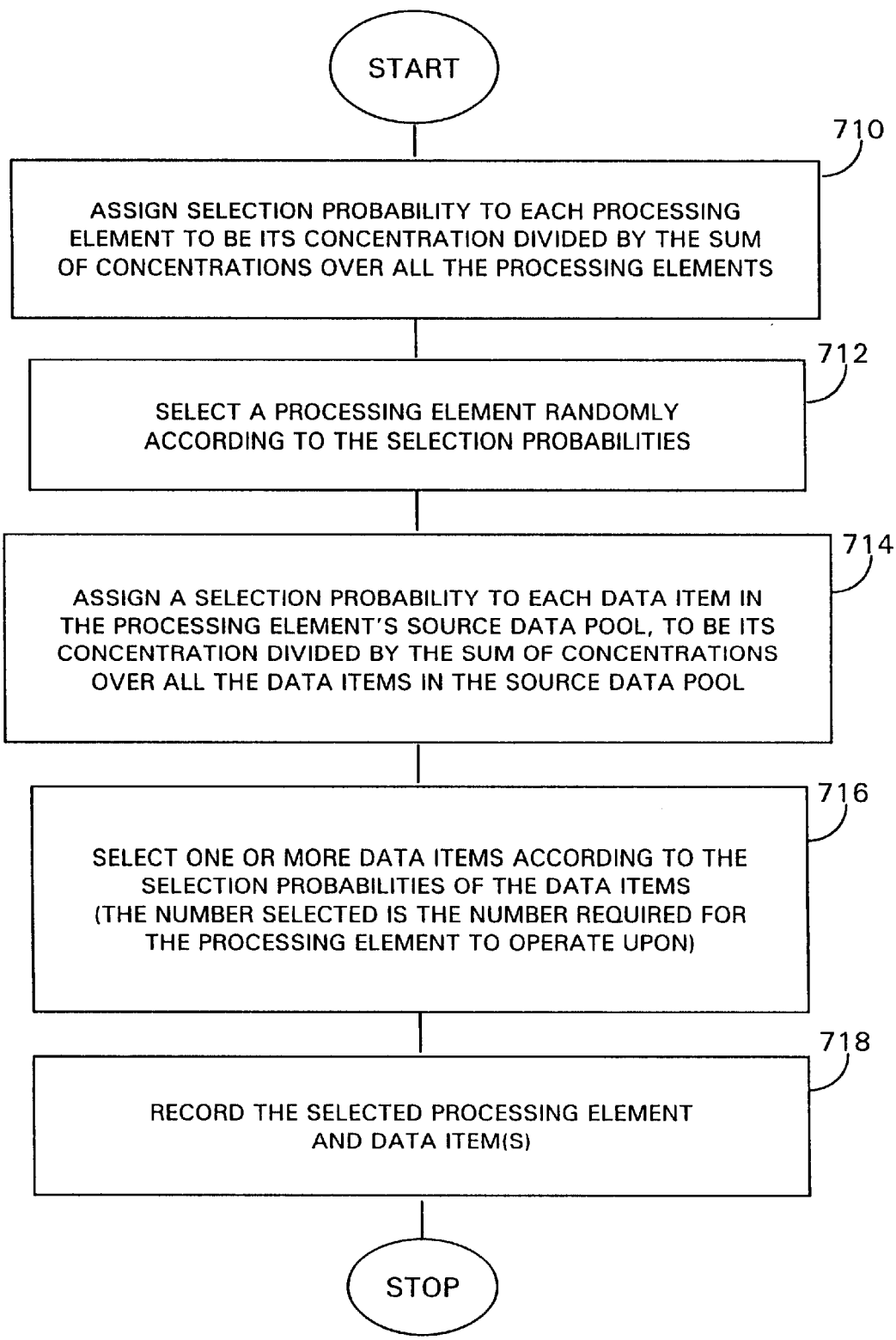
FIG. 7 is a flowchart showing a second example of the system dynamics of the information processing system of FIG. 1.

The toroidal surface, notion of position, distances, and velocities associated with instances of data items are solely used to create a system of dynamics which the controller uses (as shown in FIG. 6) to determine which processing element should operate next and which data item(s) it should operate upon. Positions are updated according to velocities autonomously and asynchronously with the operation of steps indicated in FIG. 6. An alternative version of the controller as shown in FIG. 7 uses only the concentration of data items and processing elements and therefore does not require the surface, positions or velocities described in the current example.

In the example of FIG. 6, the system controller 20 first records all processing elements as unvisited (step 610), and then proceeds to the decision—"Are there any unvisited processing elements" (step 612).

If the decision outcome is positive, the system controller 20 randomly selects an unvisited processing element (step 614), marks the selected processing element as visited (step 616), and proceeds to a decision—"Is there at least one data item in the processing element's source data pool within a predetermined distance of the processing element" (step 618).

If the decision outcome is positive, the system controller 20 selects one or more data items from those within the predetermined distance in accordance with its selection criterion (step 620), and records the selected processing element and data item(s) (step 622).

If the decision outcome is negative (step 618), the system controller 20 deselects the selected processing element (step 624) and the processing returns to step 612.

As mentioned, a variant of the system uses the system dynamics as shown in FIG. 7. In this case concentrations can be represented as non-negative real values and there is no need to use the toroidal surface, positions, distances or velocities of the earlier example. The system controller 20 is arranged to assign a selection probability to each processing element, this being defined as the concentration of the processing element divided by the sum of the concentrations over all the processing elements (step 710).

The system controller 20 selects a processing element randomly according to the selection probabilities (step 712).

The system controller 20 then assigns a selection probability to each data item in the processing element's source data pool, this being defined as the concentration of the data item divided by the sum of the concentrations over all the data items in the source data pool (step 714).

Following this, the system controller 20 selects one or more data items according to the selection probabilities of the data items (the number selected is the number required for the processing element to operate upon) (step 716), and finally, the system controller 20 records the selected processing element and data item(s) (step 718).

Referring back to the specific example of the preferred embodiment, the input to the system, as mentioned, is the set of unique integers to be sorted. At initialization of the system each of these is converted into a data item's unit length list containing the corresponding integer value. Multiple instances of each data item (equivalent to a concentration of the data item—integer value) are then placed into the external environment 12 prior to processing. In addition the sac is initialized to contain multiple instances of processing elements (equivalent to a concentration) of both "join" and "break" types.

The operation condition of a "join" processing element is that it operates on two data items, and that the higher end value of one of the data item's list is less than the lower end value of the other data item's list. Provided that this operation condition is fulfilled, the resulting operation appends the latter data item's list to the former data item's list to create a new data item containing the resulting list. This operation results in data items with increasing list lengths, but often with large gaps of "missing" integer values.

The operation condition of the "break" processing element is that it operates on two data items, one with a unit length list and the other with a list containing at least two data elements, and that the following relationship exists between the two lists: the value of the unit length list element must (a) not exist in the longer list, and (b) be both greater than the lower end value of the longer list and less than the higher end value of that list. The operation which the processing element carries out is to break the longer list into two sections (sub-lists) creating two new data item entities, one for each sub-list. Processing is more efficient when the point at which the list is split is close to the value of the unit length list element but still succeeds, albeit more slowly, in the case where the break point is always set to be the midpoint (or within one unit, i.e. data element, of the midpoint for an odd length list). In the latter less efficient case, one of the sub-lists would required to be split by at least one further break operation before a subsequent join operation could join a list containing the missing value of the unit length list.

When the system is initialized and given a set of unique integer numbers as input information, it produces progressively longer sorted lists within the sac. Eventually a fully sorted list is produced provided that sufficient processing iterations have been allowed and the number of data items in the data pools is not restricted. The fully sorted list will be of the length required by the export condition of the transfer mechanism 18, and is therefore exported into the external data pool. The sorted list can then be extracted from the corresponding data item to form the output of the system.

It will be appreciated that the example of this specific embodiment is illustrative only of how the information processing system of the present invention can be applied to carry out a particular processing task, and that it is not suggested that the system configured as described is an efficient replacement for traditional sorting algorithms.

The specific embodiment describes one representation for concentrations of data items and processing elements as the number of discrete instances in the system. Alternatively, the concentrations could be represented as non-negative real values, indicating the quantity of data items and processing elements that are present. This allows alternative systems of dynamics to be used. One such alternative would be to use a system of dynamic equations to govern the concentrations of processing elements and data items. Such a dynamic system could for instance be based on known equations previously used to model enzyme kinetics of biochemical systems.

In an alternative form of the processing system of the present invention, the transfer mechanism 18 is in the form of individual respective transfer mechanisms constituted by additional operations which can be carried out by one or more of the processing elements. In this alternative form, specific processing elements can act as importers or exporters of data items by setting their source and target data pools to be different and by assigning the processing element a "copy" operation. For example, to act as an importer the processing element's source data pool is set to the external data pool while its target data pool is set to the internal data pool. The import condition is then defined by an appropriate part of the operation condition of the processing element. This part controls the processing element to copy the source data item into the target data pool, and to destroy the source data item as normal.

An extension to the basic processing system is to allow the sac to contain one or more subsidiary sacs. In this case a subsidiary sac's external environment (and data pool) is the enclosing sac's internal environment (i.e. the environment within the sac but external to the subsidiary sacs). In this manner a hierarchy of processing sacs can be described by the system, with subsidiary sacs performing parts of the whole information processing task.

In a more limited version of the processing system, the external environment and transfer mechanism could be omitted and the initial data items introduced directly into the sac during initialization, and as processing of the sac proceeds its constituent data items could be examined directly (by the processing elements, if they contain this function as part of their operation) for solutions to the processing task.

It is likely that processing systems of the present invention will be particularly useful within an evolutionary framework. A known technique such as Genetic Algorithms could be used to determine various attributes of the system including the processing elements' operation condition and operations performed. The processing system of the present invention is potentially more "evolvable" than existing systems and computer languages.

What is claimed is:

1. An information processing system comprising:
    a first data pool containing information in the form of initial data items;
    a plurality of processing elements disposed within said first data pool for processing data items; and
    a system controller arranged to control the processing elements to take selectively at least one data item from a plurality of data items currently in said first data pool thereby making selected data item(s) unavailable for selection by any other processing element;
    in which system, each of the processing elements is arranged to perform, wholly independently of any other processing element, a respective operation on its selected at least one data item and produce a resultant data item, and to place the resultant data item into said first data pool thereby updating the aggregate of data items currently in said first data pool.

2. A system as in claim 1, wherein said system controller is arranged such that said selective taking of at least one data item from a plurality of data items in said first data pool is on a random basis.

3. A system as in claim 1, further comprising:
    a second data pool containing input information and output information in the form of data items,
    said second data pool being adjacent to said first data pool and separated from it by a boundary; and a transfer means for importing data items of input information from said second data pool to said first data pool and for exporting data items of output information from said first data pool to said second data pool.

4. A system as in claim 3, wherein the transfer means includes one or more of the processing elements.

5. A system as in claim 4, wherein:
    at least one of said processing elements of the transfer means is arranged to import data items of input information from said second data pool to said first data pool, such a processing element being referred to as an importing processing element; and
    at least one of said processing elements of the transfer means is arranged to export data items of output information from said first data pool to said second data pool, such a processing element being referred to as an exporting processing element.

6. A system as in claim 5, wherein at least one of said importing processing element is a different processing element from at least one of said exporting processing element.

7. A system as in claim 5, wherein a single processing element constitutes both said importing processing element and at least one of said exporting processing element.

8. A system as in claim 5, wherein at least one of said importing processing element is arranged to select a data item of input information from said second data pool in accordance with a first predetermined criterion, to create a copy of said selected data item of input information and place said copy into said first data pool, and to destroy said selected data item of input information.

9. A system as in claim 5, wherein at least one of said exporting processing element is arranged to select a data item of output information from said first data pool in accordance with a second predetermined criterion, to create a copy of said selected data item of output information and place said copy into said second data pool, and to destroy said selected data item of output information.

10. A system as in claim 1, wherein each of the processing elements is arranged to distinguish between data items that it is allowed to operate upon and data items that it is not allowed to operate upon.

11. A system as in claim 1, wherein at least one of said processing elements is arranged to perform a join operation on two or more selected data items.

12. A system as in claim 1, wherein at least one of said processing elements is arranged to perform a break operation on a selected data item.

13. A system as in claim 1, wherein said system controller is arranged such as to determine the rate at which at least one of the processing elements performs its selection from said first data pool.

14. A method of processing information comprising the steps of:
    (i) initializing a first data pool with a plurality of initial data items and a plurality of processing elements, and, for each of the processing elements,
    (ii) selecting, in accordance with a predetermined function, at least one of the data items currently in said first data pool and taking the selected data item(s) from said first data pool thereby making the selected data item(s) unavailable for selection by any other processing element,
    (iii) performing, wholly independently of any other processing element, by the associated processing element, a respective operation on its selected data item(s) and producing a resultant data item, and
    (iv) placing the resultant data item in said first data pool thereby updating the aggregate of data items currently in said first data pool.

15. A method as in claim 14, wherein said predetermined function of the selecting and taking step randomises the selection of said at least one data item.

16. A method as in claim 14, wherein the selecting and taking step includes a substep of distinguishing between data items that the processing element is allowed to operate upon and data items that it is not allowed to operate upon.

17. A method as in claim 14, wherein said step of initializing said first data pool with a plurality of initial data items comprises transferring data items which meet a first predetermined criterion relating to input information from a second data pool to said first data pool.

18. A method as in claim 17, including a step of transferring data items which meet a second predetermined criterion relating to output information from said first data pool to said second data pool.

19. A method as in claim 14, wherein the performing step comprises a join operation on two or more selected data items.

20. A method as in claim 14, wherein the performing step comprises a break operation on a selected data item.

21. A method as in claim 14, wherein said predetermined function defines the rate of selection of said at least one data item.

* * * * *